(No Model.) 8 Sheets—Sheet 1.

A. H. EMERY.
MACHINERY FOR TESTING THE STRENGTH OF METAL.

No. 278,918. Patented June 5, 1883.

WITNESSES: Walter Allen, Hatty E. Knight

INVENTOR — Albert H. Emery
BY Knight Bros, attys (No Model.) 8 Sheets—Sheet 3.

A. H. EMERY.
MACHINERY FOR TESTING THE STRENGTH OF METAL.

No. 278,918. Patented June 5, 1883.

Witnesses:
Walter Allen
Harry C. Knight

Inventor
Albert H. Emery
By Knight Bros
Attys

(No Model.) 8 Sheets—Sheet 4.

A. H. EMERY.
MACHINERY FOR TESTING THE STRENGTH OF METAL.

No. 278,918. Patented June 5, 1883.

WITNESSES Walter Allen, Harry E. Knight

INVENTOR Albert H. Emery BY Knight Bros Attys

N. PETERS, Photo-Lithographer, Washington, D. C.

(No Model.) 8 Sheets—Sheet 7.

A. H. EMERY.
MACHINERY FOR TESTING THE STRENGTH OF METAL.

No. 278,918. Patented June 5, 1883.

WITNESSES.
Walter Allen
H. E. Knight

FIG. 240.

INVENTOR
Albert H. Emery
by Knight Bros.
Attys

FIG. 242.

N. PETERS, Photo-Lithographer, Washington, D.C.

(No Model.) 8 Sheets—Sheet 8.
A. H. EMERY.
MACHINERY FOR TESTING THE STRENGTH OF METAL.
No. 278,918. Patented June 5, 1883.

WITNESSES.
Walter Allen
Harry E. Knight

INVENTOR
Albert H Emery
BY Knight Bros
Attys

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

MACHINERY FOR TESTING THE STRENGTH OF METAL.

SPECIFICATION forming part of Letters Patent No. 278,918, dated June 5, 1883.

Application filed February 5, 1881. (No model.)

*To all whom it may concern:*

Be it known that I, ALBERT H. EMERY, of the city, county, and State of New York, have invented certain new and useful Improvements in Machinery for Testing the Strength of Metal and other Materials, of which the following is a specification.

This invention is applicable to machines of large capacity for producing and measuring strains of tension or compression, or torsion, or transverse loads to various materials and structures.

The machine is constructed with coupled load-beams adapted for use respectively and interchangeably as the bed and platform of the scale, according to whether a strain of tension or compression is to be produced. The load-beams are connected adjustably to one end of the straining-screws, to which the straining apparatus is applied. The load-beams and also (if preferred) the load-beam ends of the screws and their attachments are supported on a movable bed having a limited sliding motion on a stationary foundation, and provided with springs arranged in pairs in connection with a casing or bearings in such a manner that both springs of each pair will be acted on by a movement of the bed in either direction by the recoil on the breaking of a specimen, and will restore the bed to its normal position. The cases or bearings of the springs are provided with screws and followers adapted to put any required initial pressure on the springs. The movement of the bed is also resisted by its friction on its foundation, this friction being regulated in extent by clamp bolts and nuts, by which the bed is held down. The coupled beams are secured against relative lateral motion by flexible fixing-plates attached together at their extremities and to the respective beams at their centers. They are further secured against independent motion laterally to the machine, and are adjusted laterally by horizontal stay-rods and setting-nuts. The said beams are secured against vertical motion by vertical flexible rods or plates applied to their backs, which preferably form the means of their attachment to the movable bed, the straining-screws being independently mounted on pillar-blocks or standards rising from the said bed. To hold the beams with their faces parallel and vertical, and to prevent them tipping toward each other on the supporting-rods applied to their backs, springs are employed, attached each at one end to the face of one of the beams and attached together at their other ends, the force required in straining the ends of the said springs together being determined by their distance asunder, which may be regulated as required by the insertion of washers between them and the faces of the beams to which they are attached. These springs serve also to secure the beams against relative vertical motion and to press them together on the liquid-pressure supports which are interposed between them. The beams are connected to the pillar-blocks or standards by setting-rods provided with screw-nuts, by which either of the beams which are to constitute the scale-bed may be brought home against its rigid bearings on the straining-screws. Rubber washers or cushions are interposed between the metallic washers of the setting-rods and the pillar-blocks, to prevent the breaking of the rods by the recoil movement incident to the breaking of a specimen.

The specimen-holders are operated by hydraulic pressure. They each consist of three parallel beams, the outer ones secured together by suitable tie-rods, on which the intermediate beam is movable, to serve as a clamp-jaw by the action of one or more hydraulic rams placed between it and one of the outer beams of the holder and connected by liquid-pipes with an accumulator, pump, or other means for producing the pressure. One of the holders is attached to the straining-beam or press by a link and pins, and is mounted on a truck running on rails or ways. The other holder is supported on vertical rods, allowing free longitudinal movement, and is fixed against lateral movement by stay-rods, and, when the machine is used for strains of compression, bears directly against the one of the coupled beams which is to form the free platform of the scale, and is firmly clamped to said beam. When the machine is used for tension, the said holder may be placed on the opposite side of the coupled beams and connected thereto by the same clamp, (the specimen to be tested passing through apertures in the beams;) or, if the specimen be short, the holder is located as when used for compression, and connected with the free load or platform beam by a link passing through the apertures in the coupled beams and attached by a pin to a beam-block, which is clamped to the platform-beam and supported by adjustable struts of peculiar construction.

The beam-block is made reversible, so that it may be transferred from the rear to the front of the coupled beams and clamped in place of the holder to receive the thrust of a compression specimen which does not require to be gripped by a holder. Two of the beams of the specimen-holder are extended horizontally to form cheek-pieces for its attachment to the beam, beam-link, or straining mechanism. The holder-jaws, when released from pressure, are opened by the weight of the moving jaw, assisted, if necessary, by springs. Their closure is limited by check-blocks. The liquid-pressure pipes are provided with two-part couplings, with a diaphragm or flexible sealing-plate attached permanently to each, so that the pipes may be uncoupled, when necessary, without releasing the pressure-liquid which they contain. The liquid-pressure supports interposed between the beams for receiving the load are constructed with compound liquid-chambers of different areas for transmitting reduced pressure, and are provided on one or both faces with a plurality of rubber cushions, which adapt the bearing-surfaces of the supports to accommodate themselves to the expansion and contraction of the surfaces of the beams with which they are in contact, caused by the slight deflection of said beams under heavy strains. The use of a plurality of these cushions prevents the tipping of the support-base. The pressure-diaphragms of the supports are bent at their edges and secured to their columns and to the case and base, respectively, within dovetail grooves by means of metallic or other packing tamped into said grooves. The fixing-plates which stay the support-columns against lateral motion are similarly secured at one or both edges; or, where the parts are required to be separable, the inner edge of the annular fixing-plate may be permanently secured to the column and the outer edge clamped to the casing. The pressure is transmitted through the medium of any necessary number of liquid-pressure reducers. The base or receiving-head of the reducer contains small removable pressure-receivers—one for each of the pressure-pipes coming from the load-beam supports. The said small pressure-receivers are each constructed with a stem for the reception of the liquid-pressure pipe, and with a small pressure-column attached to the head of the said stem through the medium of a pressure-diaphragm and a lining-plate permanently connected at their edges, clamped to the reducer-base by a sealing-ring, and containing the liquid-pressure chamber between them. The delivering-head of the reducer is removable, being connected by the pressure-diaphragm with a separable head forming part of the pressure-column. The main part of said column is stayed at top by a fixing-plate separate from the pressure-diaphragm. Heavy strains are applied by a double-acting hydraulic press with piston-rods extending in both directions—one for applying strains of tension and compression, and also for transverse strains by the use of other accessory appliances, the other for torsional strains, which are applied through the medium of a chain-frame, double chain, and saddle arranged to impart forcible rotation in either direction to a torsion arm or wheel, which is also formed with a worm for applying lighter strains by means of screw-gearing. The double chains are fixed each by one end or saddle to the lugs on the straining arm or wheel, and one of them is connected permanently to the chain-frame. The extremity of the other chain is connected to the chain-frame by bolts and nuts, which, by straining the chain in one direction and the chain-frame in the other, tightens both the chains at once. Stay-rods brace the bearings of the straining arm or wheel and of the straining beam or press relatively to each other. The screw-gearing is thrown in and out of connection by means of a screw-shaft rotated by a crank, and serving to raise and lower a bed which carries the driving-screw. From the straining arm or wheel torsion is communicated to the specimen through a torsion-bar constructed with a head, by which it is connected to a supporting-beam, the latter being mounted to slide longitudinally on suitable guideways, and adjusted vertically and transversely by setting-screws. The specimen is supported and centered by an adjustable beam formed in two parts bolted together and holding the specimen between them. To the head of the torsion-bar is connected a straining-crank adjustable in length to suit specimen-cranks of any length of arm, and formed at its extremity with a seat and cap to receive a crank-pin of any size, the size of the seat for the pin being varied by the introduction of concentric dies. The strain of torsion applied in either direction to one end of the specimen is weighed by clamping it at or near its other end or at any suitable part of its length in a stationary holder consisting of two beams bolted together with a hydraulic gripping-jaw between them, dies being interposed, if necessary, to suit the size and shape of the specimen. The connected beams of the holder are each formed with a projecting arm, which arms transmit the strain through thrust-plates and flexible connecting-plates to scale-beams acting on hydraulic-pressure supports, from whence pressure is conducted through liquid-pipes to suitable weighing mechanism. Two sets of thrust-plates are used, operating on separate load-platforms, supports, and pressure-pipes, to transmit strains in opposite directions, the thrust-plates which are to be used being bolted to their load-platforms and the opposite ones disconnected from theirs. The disconnected and disused platforms are held against their supports and in proper parallelism with the corresponding scale-beds by rods and springs. The holders are stayed longitudinally of the machine by flexible plates. The holders and the free end of the horizontal thrust-plates are supported by standards with thin-plate connections.

In the accompanying drawings the invention is represented by twenty-seven figures, numbered 219 to 245, inclusive.

1431 represents a foundation of any suitable construction. To the bed-plate 1432 is secured a movable bed, 1434, by means of bolts 1435, secured permanently to the bed or foundation, and provided with the clamp-nuts 1436, by which the bed 1434 is forced to its bed-plate with any necessary friction. The holding-bolts 1435 extend down through clearance-openings in the masonry or concrete bed, and are anchored to metal plates at bottom. The clearance-openings allow free recoil to the beds without bending the holding-bolts.

1433 represents horizontal stay-rods, which may or may not be connected at their center, and are fixed at their ends by clamp-nuts 1437 to the movable bed 1434. The said rod or rods pass longitudinally through a case or bearing, 1438, which is permanently attached to the bed-plate 1432 by screw-bolts 1439, and is constructed with a central abutment, 1440, for the followers 1441, which receive pressure from the ends of springs 1442. The other ends of the said springs bear against followers 1443, which are formed with stems, as shown, passing through the ends of the case 1438, and are adjustable therein by means of set-screws 1444, threaded in the ends of the case 1438, and locked in any position to which they may be set by jam-nuts 1445. The rods 1433 pass freely through the followers 1443 and 1441, and are coupled at their inner ends within the center of the case 1438 by a nut, 1446, which is adapted to slide within the abutment 1440, and bears against the followers 1441 on either side. The rods 1433 bear on the extremities of the necks of the collars 1443 by nuts 1447, locked by jam-nuts 1448. It will now appear that any movement of the bed 1434, acting through the clamp-nuts 1437, rods 1433, and followers 1441 1443, will compress both of the springs 1442, so that the resilience of both will be exerted to restore the bed to its central or normal position. To the bed 1434 are fixed standards 1449 1449a, constituting pillar-blocks for the straining-screws 1450, which are secured to the said pillar-blocks by collars 1451 1452 and nuts 1453 1454.

1455 1456 are a pair of coupled beams constituting alternately and interchangeably the bed and platform of the scale, hydraulic supports being interposed between the said beams to receive and transmit the load, as hereinafter described. These beams are adjustable longitudinally on the straining-screws 1450, so that either which is to constitute the bed of the scale for the time being may be brought firmly home against the nuts 1453 or collars 1452, as the case may be, while the other beam is left free to serve as the platform of the scale. This adjustment of the beams is effected by setting-rods 1457 1458, secured separately to the respective beams 1455 1456, and adjustable in the pillar-blocks 1449ª 1449 by nuts 1459, between which nuts and the respective pillar-blocks are interposed metallic washers, and beneath these gum-elastic washers 1460, for the purpose of allowing a slight resilience, to prevent the snapping of the said rods by the concussion incident to the breaking of a specimen. The setting-rods require to have clearance in the pillar-blocks. When one pair is to be tightened to bring the beam to which it is attached against its bearings on the straining-screws, the other pair of setting-rods are first relaxed to free the beam to which they are attached. The weight of the beams is sustained by flexible rods 1461, secured by bolts 1462 to the rear faces of the respective beams, and fixed below by nuts 1463 in lugs 1464 on the movable bed 1434.

Figure 220:
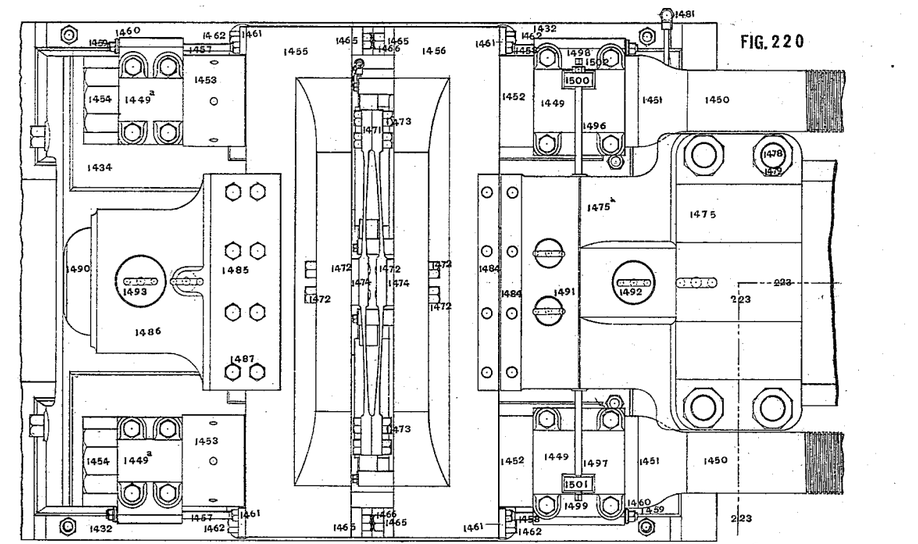
Fig. 220 is a plan of the same.
Figures 221, 221A, 222:
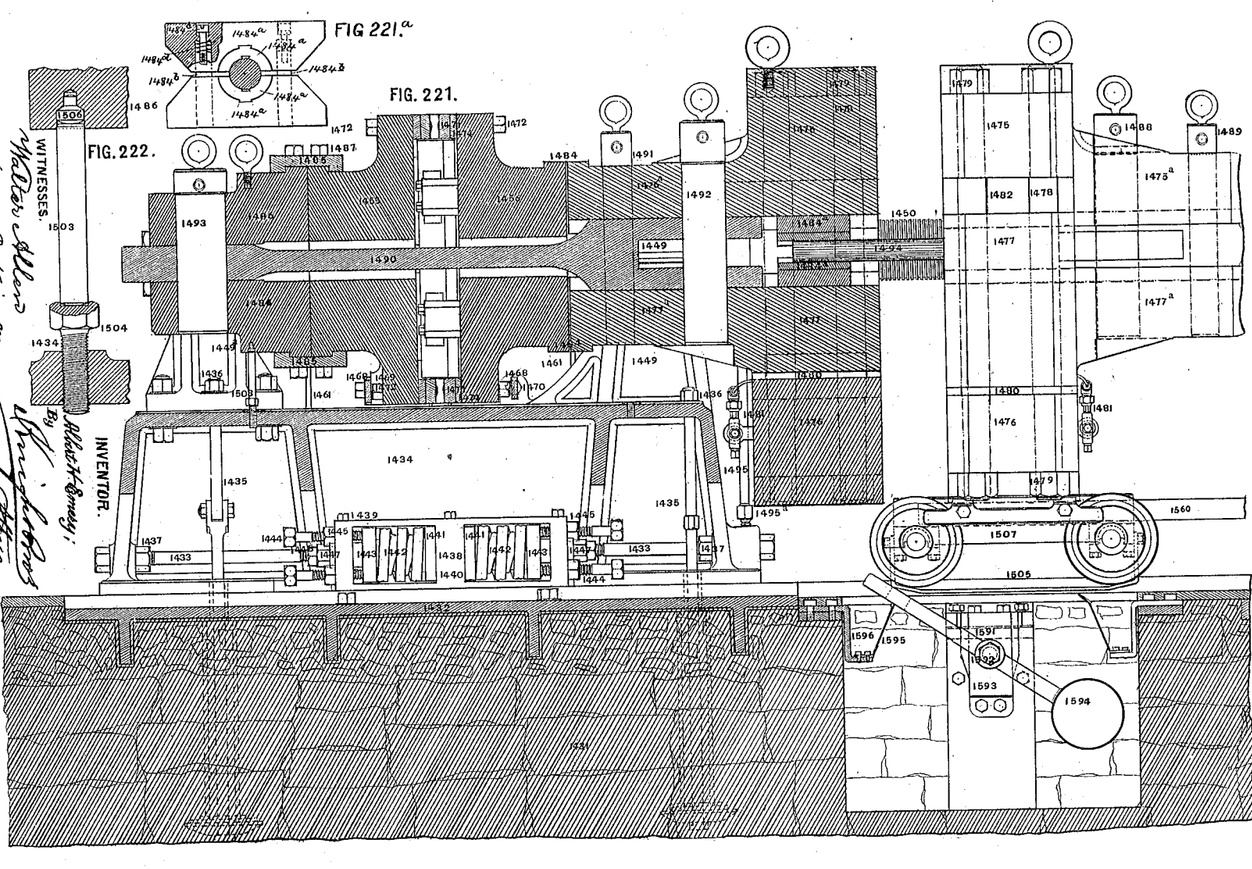
Fig. 221 is a vertical longitudinal section of the same and an elevation of the straining-holder.
Fig. 221a is a front or end view of a pair of supplemental holding-dies, partly in section, with a specimen in section.
Fig. 222 is an elevation, partly in section, on a larger scale, of a beam-block, supporting-rod, and its bearings.

1465 represents spring-plates, which are bolted and secured by the nuts 1466 to the inner faces of the beams, and are strained together at their lower ends and connected by bolts and nuts 1467, so as to exert a strong pressure in forcing the beams together and keeping them firmly on the interposed bearings or pressure-supports of the scale. The plates at the same time serve to hold the faces of the beams parallel by preventing their tipping on the struts 1461, and they serve the further purpose of securing the beams against relative vertical motion. To stay the beams against horizontal motion transversely to the machine, they are held by flexible fixing-plates 1468, Figs. 219, 220, 221, 224, secured at 1469 to the respective beams, and to the pillar-blocks or bed by nuts 1470, by which the beams are adjusted transversely to the machine as required. To firmly secure the beams against relative horizontal motion laterally to the machine, fixing plates or springs 1471, Figs. 220, 221, are employed, fixed at their centers to the respective beams by bolts and nuts 1472, and bolted together at their extremities, as shown at 1473. These springs serve, in conjunction with the springs 1465, to press the beams together on the interposed pressure-supports. The degree of pressure of the springs 1471 is regulated by the interposition of washers 1474, of any thickness required, between the springs and beams, the effect of said washers being to reduce the amount of deflection which is applied to the springs in bringing their extremities together. Similar washers are applied between the springs 1465 and the faces of the beams when required.

The pillar-blocks 1449 1449ª may be made separately from the bed and attached thereto, or they may be constructed permanently with the bed. In practice it is preferred to construct one pair, 1449, as permanent parts of the bed, and for convenience of erection and adjustment to construct the other pair, 1449ª, separately and bolt them to the bed, as shown. The coupled beams and the specimen-holder, hereinafter described, at the scale end of the machine may, either or all, be supported from the movable bed, as shown in the present illustration, or upon masonry or other permanent foundation, as preferred. The specimen-holders consist each of three beams, 1475 1476 1477. The outer beams, 1475 and 1476, are secured together by bolts and nuts 1478 1479. The interposed beam 1477 is movable on the connecting-bolts 1478, constituting one jaw of a clamp, of which the beam 1475 constitutes the other jaw. The movable jaw 1477 is forced up to grip the specimen by the action of one or more hydraulic presses, 1480, Figs. 221, 223, suitable dies, 1484ª, being interposed between the beams or jaws 1477 1475, with faces formed to suit the specimen to be tested.

1481 represents the pressure-pipe for operating the hydraulic presses 1480. The closing of the jaws 1477 1475 is limited by boxes 1482, Fig. 223, containing springs 1483, by which the jaws are forced apart when released by the hydraulic presses. The two beams 1475 and 1477 of the specimen-holder are formed with projecting cheek-pieces 1475ª 1477ª, for the attachment of the specimen-holder to the load-beam of the scale or to the straining-bar, as the case may be. For the application of strains of compression, (for which purpose the beam 1456 constitutes the load-platform,) the load-beam specimen-holder is attached to the said beam by bolting to flanges 1484, formed on the specimen-holder and beam, clamps 1485, such as are shown in Figs. 219, 220, 221, and 224, fastened to similar flanges on the beam 1455 and the beam-block 1486 by bolts 1487. In the illustration given the parts are shown in position for the application of a strain of tension. For this purpose the cheek-pieces 1475ª 1477ª of the load-beam specimen-holder are connected to a beam-link, 1490, by pins 1491 1492. The link 1490 extends through central apertures, as shown in the coupled beams 1456 1455, and is connected by a pin, 1493, with the beam-block 1486, which latter is fixed to the load-beam 1455 by the clamps 1485 and bolts 1487.

1494 represents a specimen undergoing a strain of tension. In this illustration the beam 1456 constitutes the bed of the scale, being drawn firmly against the bearing-collars 1452 by the setting-rods 1458, while the setting-rods 1457 are released from strain by backing their nuts 1459, so as to leave the beam 1455 free. Clearance is accordingly seen between the beam 1455 and the bearing-nuts 1453, and also between the specimen-holder and the fixed beam 1456. When a strain of compression is to be applied the relations are reversed, the specimen-holder being in that case released from the beam 1455 and fixed to the beam 1456 by the clamps 1485 and bolts 1487, the said beam 1456 being released from the bearings 1452, so as to serve as the load-platform, and the beam 1455 being drawn firmly against the bearings 1453 by the action of the setting-rods 1457, so as to serve as the bed of the scale. When strains of compression are to be applied to columns or other specimens without the use of the holders, the beam-block 1486 is reversed in position, being clamped to beam 1456 by plates 1485 and bolts 1487, a suitable platform to receive the thrust of the specimen being attached to said beam-block by pin 1493.

Figure 219:
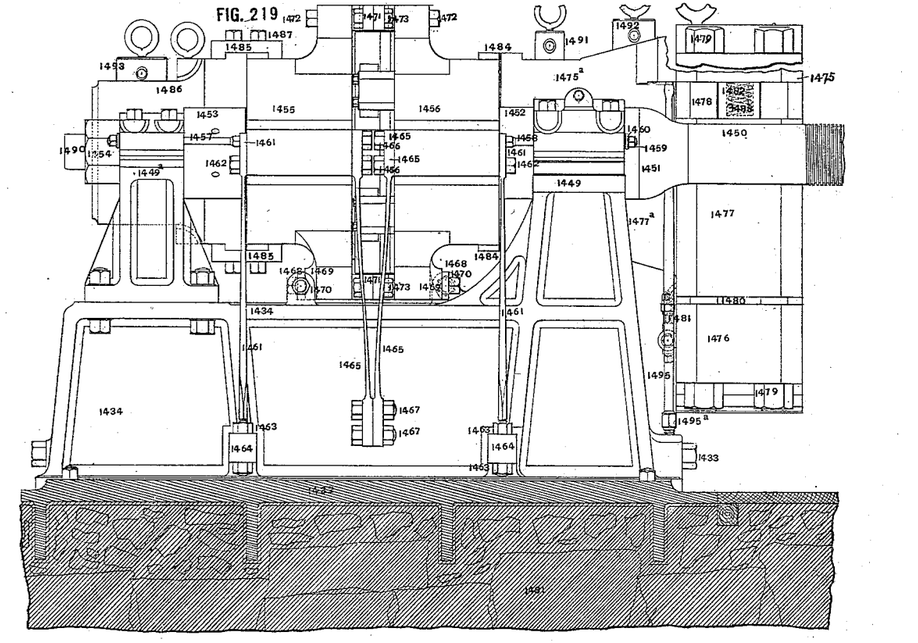
Figure 219 is a side elevation of the weigh-beam end of the machine with its holder, showing the foundation in section.
Figure 223:
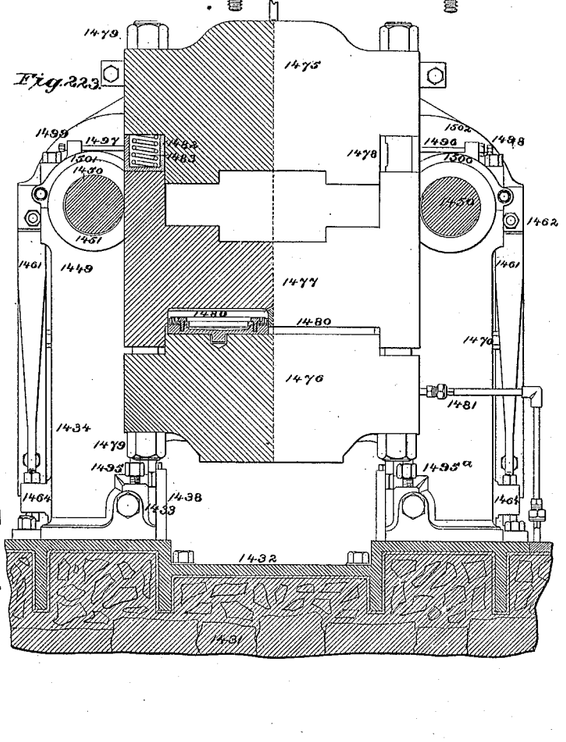
Fig. 223 is a partial transverse section on the line 223, Fig. 220, showing the holder partly in elevation and partly in section.
Figure 224:
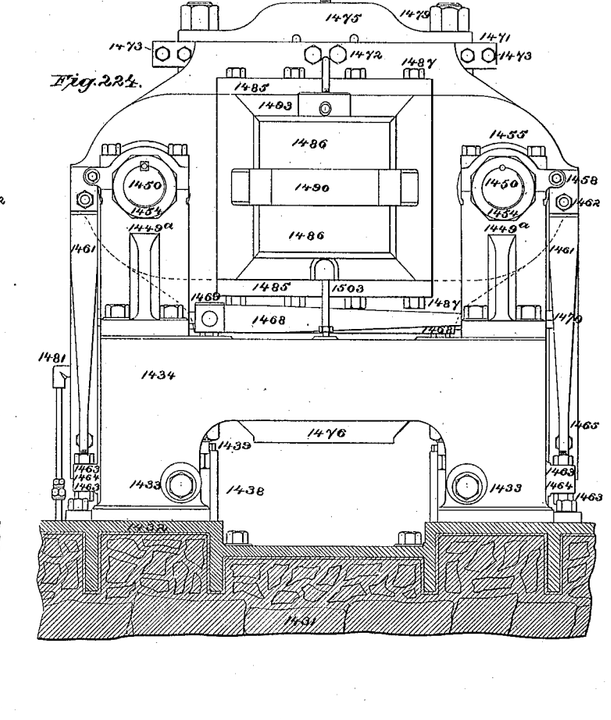
Fig. 224 is a rear elevation of the weigh-beam end of the machine.
Figure 225:
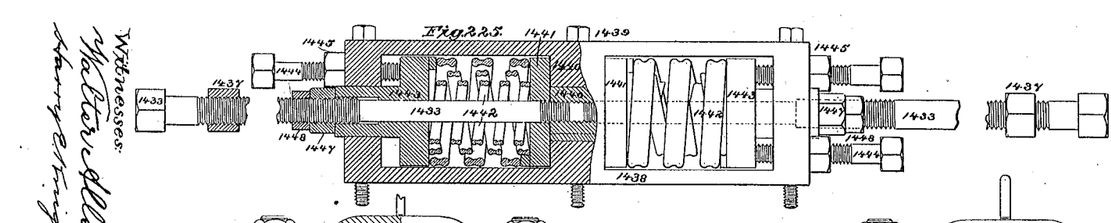
Fig. 225 is an elevation, partly in section, on a larger scale, of the recoil-spring of the movable bed and its attachments.
Figure 226:
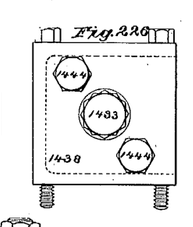
Fig. 226 is an end view of the same.

The load-beam specimen-holder is supported on rods 1495, Figs. 219, 221, 223, erected on the movable bed 1434, or on the stationary bed or foundation. The lower ends of these rods are screw-threaded, as shown in Figs. 219 and 221, and they are formed with angular collars 1495$^a$, for the reception of a wrench for screwing the rods up or down for the vertical adjustment of the holders. By reason of their length the rods possess sufficient flexibility to permit the slight movement which the specimen-holder receives in transmitting to the load-beam the strain to be weighed. The load-beam specimen-holder 1475, Fig. 220, is stayed against lateral motion by struts 1496 1497 bearing against the cheek-pieces of the said specimen-holder, and fixed by set-screws 1498 1499, screwed into lugs 1500 1501 on pillar-blocks 1449. The set-screws 1498 1499 are formed with conical or convex ends fitting corresponding cavities in the ends of the struts 1496 1497. The set-screw 1498 is first screwed in to set the specimen-holder in proper position laterally, and is then locked by a nut, 1502. The other set-screw, 1499, is then screwed in against the end of the strut 1497 to fix the specimen-holder. The beam-block 1486 is supported on a rod, 1503, Figs. 221 and 224. This rod, with its bearings, is shown on a larger scale in Fig. 222. It is formed with convex ends resting below within a cavity in the top of a standard, 1504, screwed into the bed 1434, and adjustable by the application of a wrench to its square or angular head. The upper end of the rod is received within a cavity in the block 1486, and rests against the convex end of a button or bearing-piece, 1506, set in said cavity for the purpose. Buttons similar to 1506 are applied within cavities in the cheek-piece 1475$^a$ of the specimen-holder, to receive the rods 1495 and struts 1496 and 1497, the construction of these parts being similar to that illustrated in Fig. 222 in reference to the rod 1503 and its bearings; but the greater length of the rods 1495 obviates the necessity of jointing them at their lower ends, as shown in Fig. 222.

The specimen-holder of the straining mechanism is constructed in similar manner to that already described, and is connected to the straining-power, hereinafter described, by its cheek-pieces 1475$^a$ 1477$^a$ and pins 1488 1489. This specimen-holder is preferably mounted on a truck, 1507, running on the rails or ways 1505. To determine the pressure given to the specimen by the hydraulic holders, so that the amount of pressure known to be necessary to fix and hold the specimen may be applied without injury thereto, the liquid-pressure pipes connected with the accumulator and employed to operate the holder-presses are connected with pressure-gages. Suitable gages for this purpose I have described in other applications of even date herewith.

Figures 227, 228, 229, 230, 231, 232:
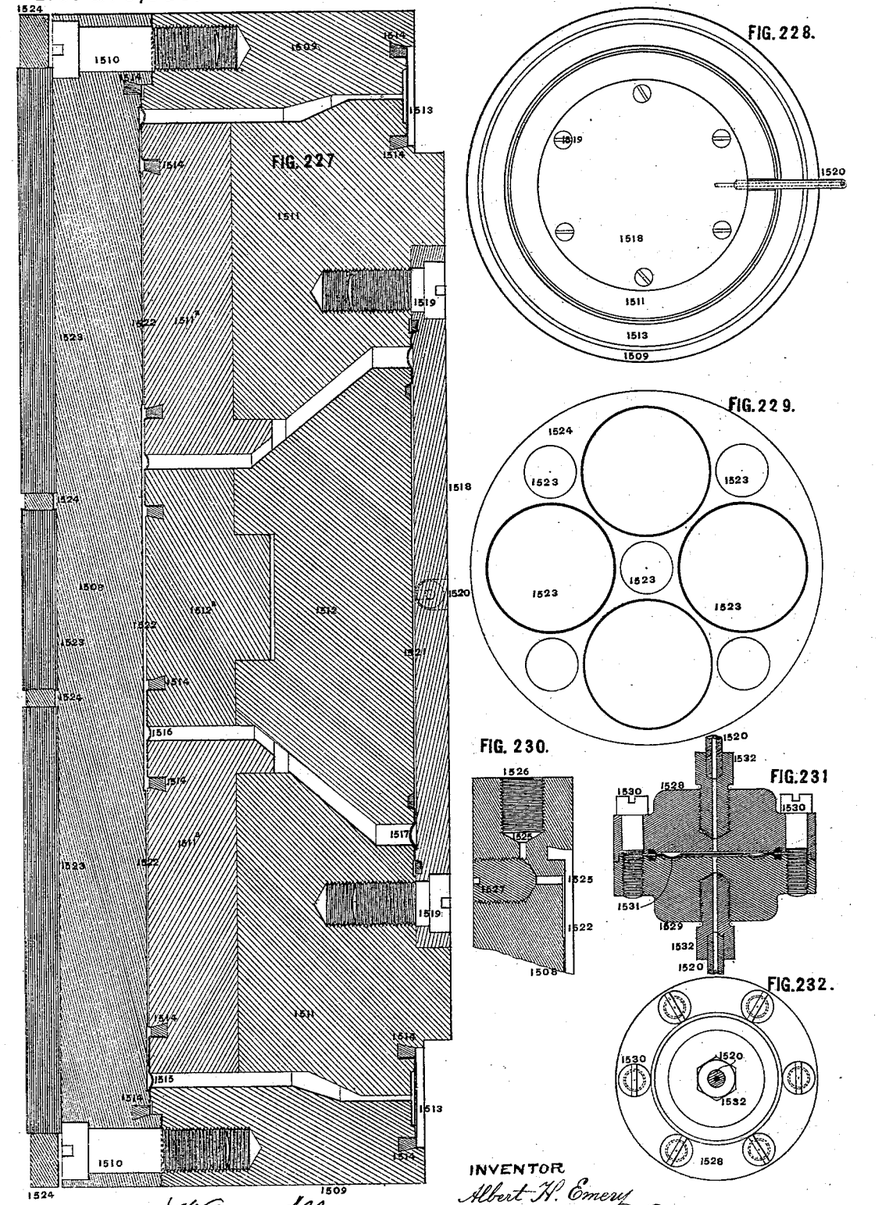
Fig. 227 is an axial section of a compound liquid-pressure support.
Figs. 228 and 229 are plans of the respective faces of the said support on a smaller scale.
Fig. 230 is a detached sectional view of a portion of a cap-plate for a support or reducer, showing a duct for introducing liquid under pressure and a plug for sealing said duct.
Fig. 231 is a longitudinal section of a coupling device for transmitting liquid-pressure from one section of a pipe to another through the medium of diaphragms secured permanently to each.
Fig. 232 is an end view of said coupling.

The construction of the liquid-pressure supports interposed between the coupled beams 1455 1456, for transmitting the load to the weighing apparatus, is illustrated in Figs. 227 to 230, inclusive. The support is constructed with a base, 1508, and a shell or casing, 1509, fastened together by screws 1510, and with two pressure-columns placed concentrically one within the other, each formed in two parts, 1511 1511$^a$, 1512 1512$^a$. The part 1511 of the outer or annular column is secured permanently to the casing 1509 by a flexible annular fixing-plate, 1513, bent at each edge, so as to enter dovetailed grooves in the column and casing, respectively, as shown in Fig. 227, and secured within said grooves by packing 1514, which preferably consists of malleable or ductile metal—such as lead or solder—tamped into the said grooves in a cold state. The other part, 1511$^a$, of the said annular column is secured to the base 1508 of the casing by an annular diaphragm, 1515, which is bent at its edges and secured within dovetailed grooves to the respective parts by metallic or other packing, 1514, as before described. The inner margin of the part 1511$^a$ of the annular column is similarly secured by an annular diaphragm, 1516, to the part 1512$^a$ of the central column. The other part, 1512, of the central column is secured by an annular diaphragm, 1517, to a chamber-plate, 1518, which is fastened by screws 1519 to the annular column 1511.

1520 represents the liquid-pressure pipe conducting from the pressure-chamber 1521 to a reducer or weighing apparatus of any suitable construction. Appliances suitable for this purpose are described in other applications of even date herewith.

1522 represents the large liquid-chamber between the base 1508 on one side and columns 1511$^a$ 1512$^a$ and diaphragms 1515 1516 on the other.

1523 are rubber cushions confined within corresponding cavities in a plate, 1524, and resting against the base or top of the pressure-support, for the purpose of permitting the slight relative motion of the opposing surfaces of the coupled beams incident to the extension and compression of said surfaces under heavy strains. The same action in kind will be obtained by boring recesses in the base or column of the support and placing therein rubber springs to receive the pressure. Great care should be taken that uniform quantities of rubber be placed in holes of corresponding size, so that the action of the different pieces of rubber or other yielding material will be uniform. The recesses must be symmetrically arranged and equal quantities of rubber placed in the opposite recesses of each pair, so as to prevent the tipping of the support by unequal yielding of the rubber. By constructing these cushions in several parts, as here shown, instead of in one, as described in another application, they are adapted to perform their proper functions without permitting the tipping of the support-bases. It will now appear that a load transmitted to the support from the beams will develop a pressure on the liquid in the large liquid-chamber 1522. The pressure, being received on the smaller end, $1512^a$, of the central column, will be transmitted to the larger end, 1512, of said column, which, acting on a larger area of liquid, will develop a reduced liquid-pressure within the chamber 1521. This reduced pressure will be communicated through the pressure-pipe 1520 to the weighing apparatus, or to a secondary reducer, if necessary.

For filling the close chamber 1522 a lateral duct, 1525, is employed, with a screw-socket, 1526, as illustrated in Fig. 230, for the reception of the nozzle of the feeding-pipe. The liquid is forced in with the necessary pressure, and the duct is then closed by a screw-plug, 1527.

For the purpose of coupling the connecting-pipes 1520 between different parts of the apparatus and permitting their disconnection without releasing the liquid which is confined under pressure in said pipes and the chambers with which they connect, the device shown in Figs. 231, 232 is employed. It consists of a pair of chambered heads, 1528 1529, fastened together by clamp-screws 1530. The chambers in the opposing faces of these heads are each covered by a diaphragm, 1531, permanently attached each to its own head. If made of different metal from the heads or chamber-pieces, the diaphragms are corrugated to permit independent expansion and contraction. The two parts of the pipe 1520 are secured to the respective heads 1528 1529 by plugs 1532, to which they are soldered. It will now be seen that any pressure in either part of the pipe 1520 will be communicated through the coupled chambers and the diaphragms 1531 to the other part of said pipe, and that for disconnecting the apparatus the pipe-joint is readily uncoupled by taking out the screws 1530 without releasing the liquid which is confined by the permanent connection of the diaphragms to the respective coupling-heads.

Figures 233, 234, 235:
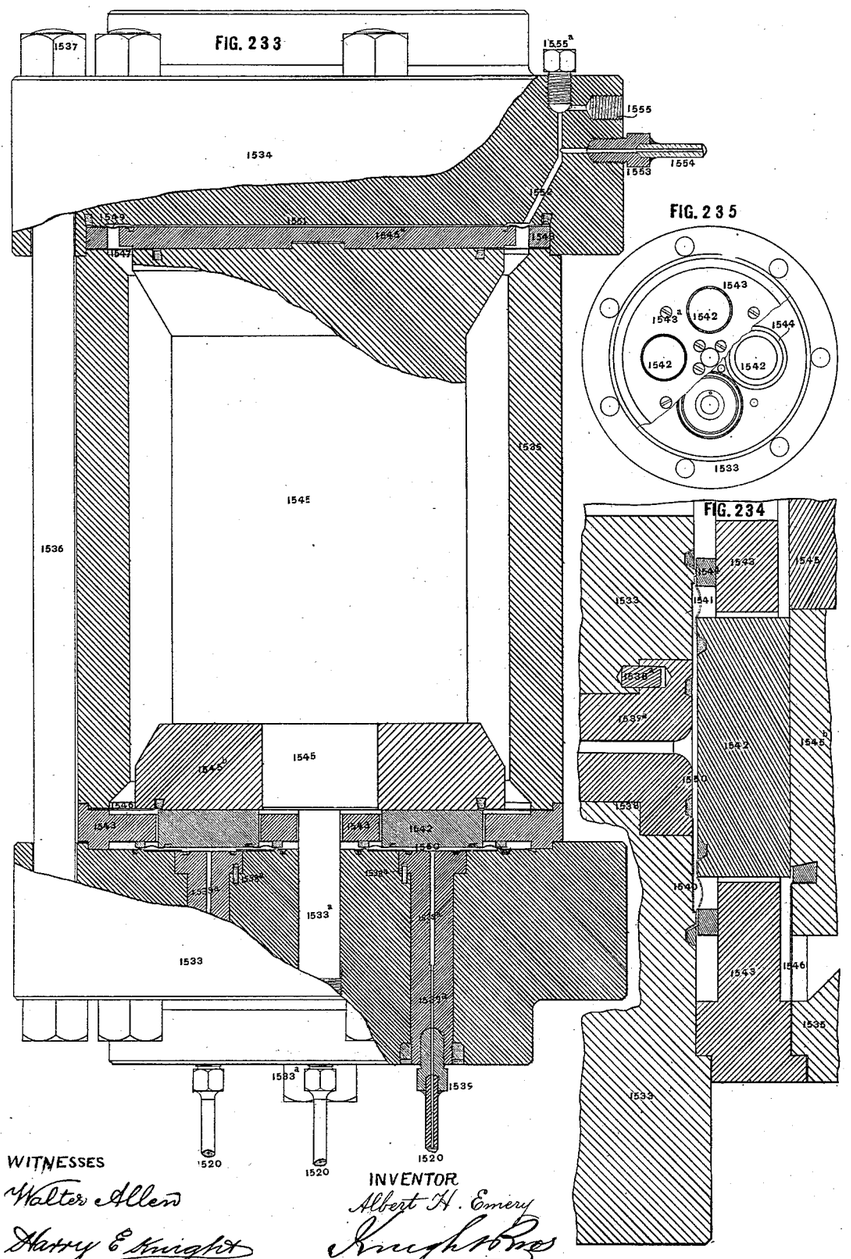
Fig. 233 is an elevation, partly in section, of a liquid-pressure reducer.
Fig. 234 is a sectional elevation, on a larger scale, of parts of the same.
Fig. 235 is a plan of the reducer on a smaller scale, with some parts removed.

A reducer suitable for use in connection with this apparatus and forming a part thereof is shown in Figs. 233, 234, and 235. 1533 and 1534 represent the two ends of the reducer, which, for convenience of designation, will be termed the "base" and "cap," respectively. 1535 is the shell or casing thereof. 1536 and 1537 represent bolts and nuts by which these parts are permanently connected. The cap 1534 is recessed, as shown, on its inner face to form a liquid-chamber. The base 1533 contains a number of tubular stems, $1539^a$, inserted from above and flanged to rest on shoulders 1538. Pins $1538^a$ hold the stems against rotation. Said stems receive at their lower ends screw-plugs 1539, permanently secured to the liquid-pressure pipes 1520. To the upper ends of the stems 1537 are secured annular lining-plates 1540, fixed at their outer peripheries to the base 1533 and to the annular diaphragms 1541, which latter are fixed at their inner margins to the small pressure-columns 1542. 1543 represents a casing-ring surrounding all the small columns 1542 and bearing on individual casing-rings 1544, one of which rests on each of the diaphragms 1541, forming the outer walls of the small pressure-chambers 1550. The main pressure-column 1545 $1545^b$ rests on all the small pressure-columns 1542, and has permanently attached to each of its ends a flexible fixing-plate, 1546 1547. The lower fixing-plate, 1546, is clamped at its outer periphery between the case 1535 and casing-ring 1543 by the bolts and nuts 1536 1537. The upper plate, 1547, is clamped between the case 1535 and a casing-ring, 1548, which also clamps an annular pressure-diaphragm, 1549, permanently secured at its inner edge to the head $1545^a$ of the main pressure-column and at its outer edge to the cap 1534. The casing-rings 1543 and 1548 are both held firmly between the case 1535 and the base and cap, respectively, by the pressure of the bolts 1536 and nuts 1537. The construction of the column in three parts, 1545 $1545^a$ $1545^b$, admits of readily separating the parts when the nuts 1537 are removed.

The liquid-pressure transmitted through the pipes 1520 is received in the small pressure-chambers 1550, one for each pipe. The aggregate of this pressure is transmitted through the small pressure-columns 1542 to the main pressure-column $1545^b$ 1545 $1545^a$, and thence to the liquid in the large pressure-chamber 1551, from whence it is transmitted through the duct 1552, plug 1553, and pipe 1554, reduced by as much as the acting area of the main chamber 1551 exceeds the sum of the acting areas of the small chambers 1550.

$1533^a$ is a gage and adjusting screw, the use of which is fully described in other applications of even date herewith.

Fig. 235 shows a plan of the lower part of the reducer, showing part of the casing-ring 1543 removed, and illustrating the use of four of the small pressure-columns 1542.

Fig. 235 shows the base 1533 of the reducer part of the casing-ring 1543 and clamping-screws $1543^a$, with three of the small pressure-chambers and their columns 1542 in position, one of them, consisting of the parts 1537 1540 1541 1542 and fixing and casing ring 1544, being removed.

The main liquid-chamber 1551 is filled under any suitable pressure through a nozzle applied to the screw-socket 1555, and the chamber is then sealed by the plug $1555^a$. In operation the liquid-pressure is transmitted through the duct 1552, nozzle 1553, and pipe 1554 to the weighing apparatus, to indicate the pressure on the liquid, and thereby show the strain on the specimen. Details of apparatus suitable for this purpose are described in other applications of even date herewith.

Figure 236:
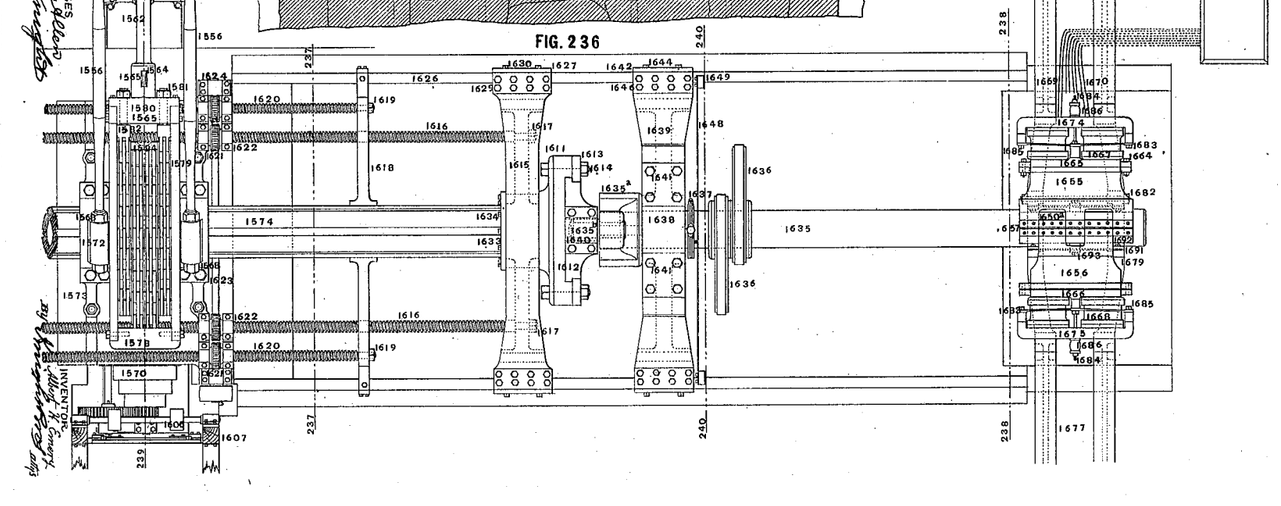
Fig. 236 is a plan of the torsion end of the machine, with a shaft and crank in position for testing.
Figure 237:
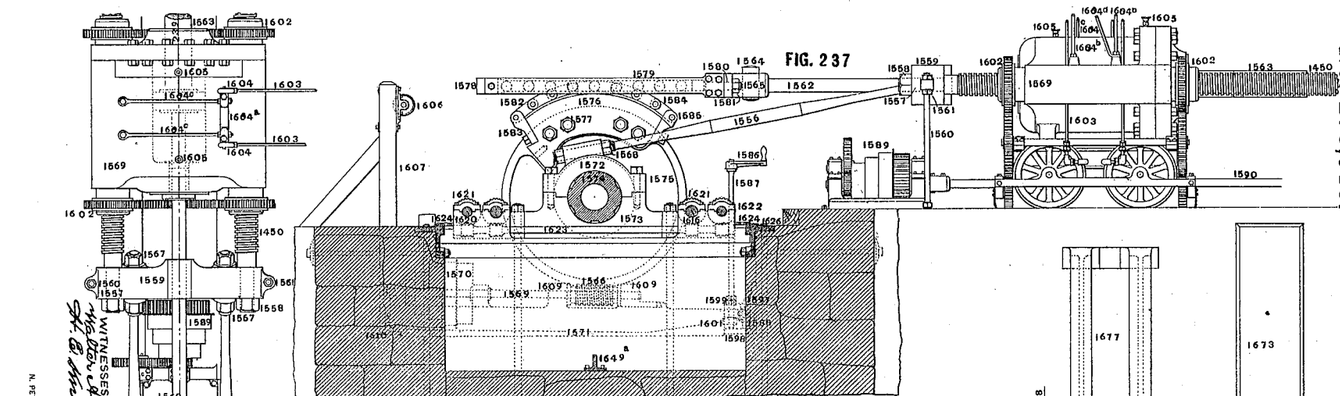
Fig. 237 is an elevation of the torsion end of the machine, with the foundation and torsion-bar in section on line 237, Fig. 236.
Figures 239, 240, 241, 242:
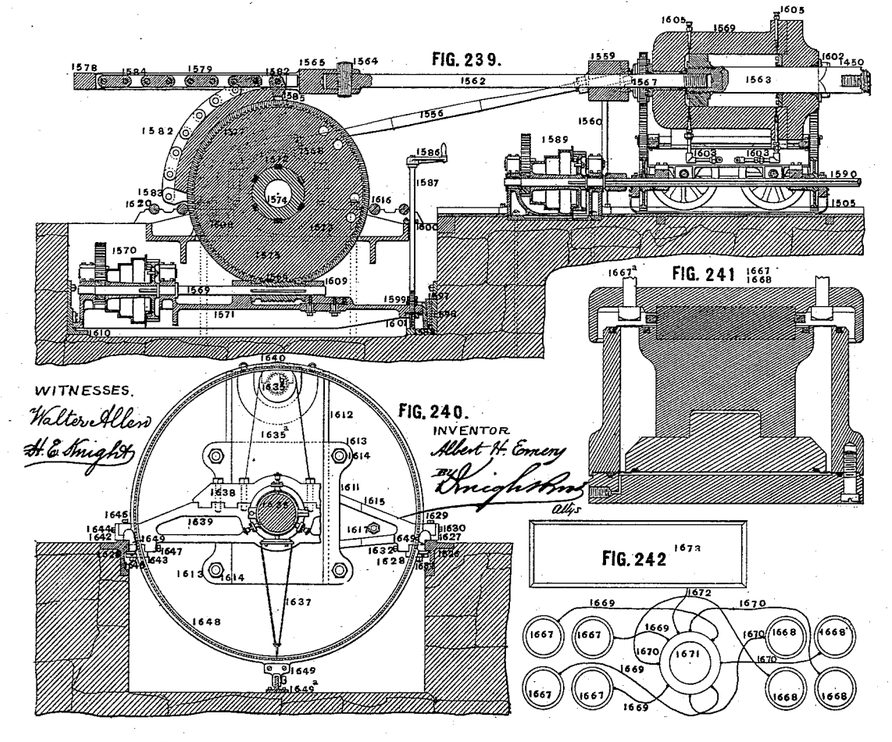
Fig. 239 is a section on line 239, Fig. 236.
Fig. 240 is a section of the specimen and foundation on line 240, Fig. 236, and an elevation of the indicating apparatus, the bearing-beams for supporting the specimen and the head of the torsion-bar and its attachments.
Fig. 241 is a central section of one of the hydraulic-pressure supports for the weighing-holder.
Fig. 242 is a diagram illustrating the relative arrangement of the hydraulic-pressure supports, their pipes and reducer, and the weigh-case.

For the purpose of giving strains of tension, compression, transverse loads, and torsion, a hydraulic press or straining-beam, 1569, Figs. 236, 237, 239, is employed. Suitable presses and beams, with their driving-gear and other accessories, I have also described in other applications of even date herewith.

The live head 1589, for driving the shaft 1590 at variable speed, as required for operating the straining beam or press 1569, is shown in section in Fig. 239 and in elevation in Fig. 237. The shaft 1590, Figs. 221, 237, 239, is supported at suitable intervals by the swinging standards 1591, rotating on their supporting-pins 1592, which are fastened to the masonry bed by the plate 1593. These swinging supports are tipped down out of the way by the contact of the holder truck or press and fastened down by notched springs 1595, the latter being fixed to plates 1596, which are bolted to cross-pieces on the track 1505. When released from these springs, the counter-weights 1594 restore the standards to their upright position.

The straining-rod 1563 is connected to the straining-holder by pins 1488 and 1489, Fig. 221, and at its other end constitutes the piston-rod of the hydraulic press 1569, Figs. 237, 236, and 239, from the piston or piston-rod of which a second straining rod or bar, 1562, extends in the opposite direction, for connection by means of the key 1564 with the torsional mechanism now to be described. The double piston-rod may be made in one piece or in two, as preferred. The straining-screws 1450 pass through wings on the sides of the hydraulic press, and, when the machine is used for strains of torsion, are rigidly connected by nuts 1558 with a stationary beam, 1559, to which the torsional straining apparatus is connected by rods 1556 and nuts 1567 and 1568.

The dotted lines at 1557 represent reduced portions of the straining-screws 1450 for the reception of the connecting-beam 1559. The said beam is supported by vertical rods 1560 and adjusted in height by nuts 1561 on said rods. The connecting-rods 1556 may be secured, as shown, to the caps 1572 of pillar-blocks 1573, in which the torsion-bar 1574 has its bearings; or they may be secured directly to the bed or pillar-block 1573. The torsion-bar 1574 is adjustable longitudinally within the pillar-blocks 1573, and within a worm-wheel, 1575, or a straining-arm in lieu thereof, which is adapted to rotate the torsion-bar by splines and grooves, and is confined longitudinally by the pillar-block caps. If preferred, the worm-wheel may be constructed with a hub extending into the pillar-blocks and constituting the torsion bar or shaft by receiving the specimen to be tested, the specimen being attached to the end of such shaft or hub or fastened within it, according to its own form or proportions.

On the straining-arm or worm-wheel 1575 is mounted a chain-saddle, 1576, secured thereto by pins or tapered bolts 1577, and employed for the connection of a chain-frame, 1578 and 1579, of which the cross-head 1565 forms a part.

1580 represents bolts secured adjustably to the cross-head 1565 by nuts 1581, and employed for the attachment to the chain-frame of the chains 1582, the other extremities of which are connected to the lugs 1583, bolted to the chain-saddle 1576.

1584 represents a central chain connected to the cross-head 1578 of the chain-frame at one end, and at the other end to a lug, 1585, bolted to the chain-saddle 1576. The chains are thus arranged for one to wind on the chain-saddle or wheel or arm as the other unwinds, so as to rotate the torsion-bar in either direction by the action of the press or straining-beam 1569. They are operated either by the double-acting hydraulic press therein contained, or by the nuts 1602, Figs. 236, 237, and 239, which set and move the said press or straining beam on the screws 1450, these nuts being driven and operated at variable speeds by the live head 1589 through intermediate gears and connections described in other applications of even date herewith. The screw-gearing is employed for applying comparatively light strains, and may be stopped at any period of the operation, and a gradually-increasing strain applied by the hydraulic press actuated by liquid supplied under pressure from an accumulator. For conducting the pressure-liquid from the accumulator, pipes 1603 are employed, having flexible joints 1604, bolted to the beam 1604$^a$, which is stayed in position by struts and braces 1604$^b$ 1604$^c$ 1604$^d$.

The accumulator and pipes are both of peculiar construction and specially adapted for use with testing-machines. They are both specifically described in other applications of even date herewith.

At the top of the press-cylinder 1569 are air-vents 1605, through which any air is allowed to escape from the cylinder on the introduction of liquid from the accumulator, after which said vents are closed.

The straining-rod 1562 is connected with the chain-frame 1565 by a key, 1564, when the torsion specimen is to be strained by said straining-beam or press. When the specimen is to be strained by the driving-gear 1570, the press is run back to the beam 1559, and the piston is run back in the same direction to its limit in the press-cylinder. The part of the chain-frame not supported on the circular bearings on the chain-saddle will then rest on the wheels 1606, carried on posts 1607. The key 1564 may now be removed and the press or straining-beam 1569 may be used for tension or compression or transverse loads without disturbing the torsion apparatus. When the chain-frame is run back to its extreme limit, as illustrated in Fig. 239, it may be attached by bolts to suitable seats on the bed and disconnected from the worm-wheel 1575 by removing the bolts 1577, either with or without disconnecting it from the straining-bar 1562.

As a substitute for the chains and chain-saddle, suitable racks may be used, either with a cog-wheel or a cogged saddle, in connection with other parts of the invention.

When the worm-wheel is disconnected from the chain-frame or its equivalent, it is free to be operated by the direct application of screw-gearing constructed as follows:

The screw 1566 is keyed to its shaft 1569, or is made solid in one piece therewith. Bearings for the shaft and screw are cast or placed on the bed 1571. To prevent backlash of the screw, one of these bearings, 1609, is preferably made adjustable on its bed.

1586 is a crank to drive a screw, 1587, passing through a stationary bearing, 1600, bolted to the bed-plate 1573 and through the movable bed-plate 1571, and working at its lower end in a threaded sleeve, 1601, on which one end of the bed 1571 rests, so as to be moved up or down to bring the screw 1566 into or out of gear with the worm-wheel 1575. The other end of this bed rests on a plate, 1610, bolted to it and to the masonry. The screw 1587 carries lock-nuts 1599, so adjusted that, when the bed 1571 is brought firmly against them by turning the screw 1587, the screw 1566 will be properly in mesh with the worm-wheel 1575. This screw and its shaft 1569 are now operated to turn the torsion-bar in either direction at variable speeds and power by the driving-gear 1570, which is similar to the gear 1589, already referred to, and more particularly described in another application of even date herewith. The bed 1571 is firmly fixed against longitudinal motion by the wedge 1597 and adjustable plate 1588, bolted to the anchor-plate 1598. The screw 1566 is disconnected from the worm-wheel 1575 by lowering the bed 1571 by the screw 1587 when the chain-saddle and straining-bar 1562 are to be used to turn the torsion-bar. If preferred, the driving-gear 1570 of the screw-shaft 1569 may be mounted in stationary bearings, instead of on the movable setting-bed 1571, which carries said shaft, and may be connected to the screw-shaft by a clutch or a universal joint.

The torsion-bar 1574 has keyed to it a head, 1611, adapted to carry hydraulic specimen holders described in other applications of even date herewith. It is here shown carrying a crank-arm, 1612, clamped adjustably thereto by plates 1613 and bolts and nuts 1614. The head 1611, with one end of the torsion-bar 1574, is supported and fixed against vertical and lateral movement by the beam 1615, which is moved to bring the head in any desired position by the screws 1616, fastened thereto by nuts 1617. The torsion-bar and these screws are supported intermediately by a beam, 1618, which is adjusted by screws 1620, clamped thereto by nuts 1619. The screws 1616 and 1620 are operated by worm-nuts 1621, held between boxes 1622 on the bed 1573, which constitute the bearing of the screws and hold the nuts against longitudinal motion. The screws 1616 have double the pitch of the screws 1620, by which means the beam 1618 is kept midway between the beam 1615 and the bed 1573. The nuts 1621 are driven by a shaft, 1623, carried in pillar-blocks 1624 and driven by a band-wheel. The beam 1615 is carried on ways 1626, fixed adjustably against vertical and lateral movement by plates 1627 1628, fixed thereto by bolts 1630 1631, and adjusted by setting-screws 1629 and 1632, respectively. The said beam is bored to receive the hub of the head 1611, to which it is clamped by a plate, 1633, secured by bolts 1634 in such a way as to permit rotation of the head and cause it to move longitudinally with the beam.

1635 1635$^a$ 1635$^b$ represent a specimen in position for testing. The said specimen carries on its shaft 1635 eccentrics 1636 and indicators 1637, and rests at one end in a fixing and supporting box in the beam 1638 and 1639. 1635$^a$ is the crank-arm of the specimen, and 1635$^b$ the crank-pin thereof, the latter being fixed in a suitable seat in the extremity of the straining crank-arm 1612 by the cap 1640, bolted thereto. By the use of concentric dies the said seat and cap are adapted to receive and hold different-sized pins. It is preferred to employ for large and small specimens, respectively, two straining crank-arms of different sizes adjustable in radial length by the clamp-plates 1613 and bolts and nuts 1614, before described.

The torsion-head 1611 and clamp-plate 1613 may, if preferred, be made in one piece, and a screw provided to adjust the length of the straining-arm 1612 by sliding it in its seat.

The two parts of the beam 1638 1639 are fastened together by screw-bolts 1641, and by the use of adjusting concentric dies support in the axis of the machine the shaft 1635 of the specimen. The beam 1638 1639 is supported by and fixed adjustably to the ways 1626 by plates 1642 1643, fastened thereto by bolts 1644 1645, the adjustment of the beam being effected by setting-screws 1646 1647, by which the axis of the specimen is there fixed in the axis of the machine. Two or more indicators, 1637, are applied at different points on the specimen in connection with graduated arcs 1648, thus showing the amount of torsion at different parts of the specimen.

Fig. 240 shows one of the indicators with its attaching-ring and a graduated arc, 1648, and fixing bearing 1649, which are attached to the rail 1649$^a$ and the ways 1626. These indicators and arcs and the use thereof are more fully described in another application of even date herewith.

Figure 238:
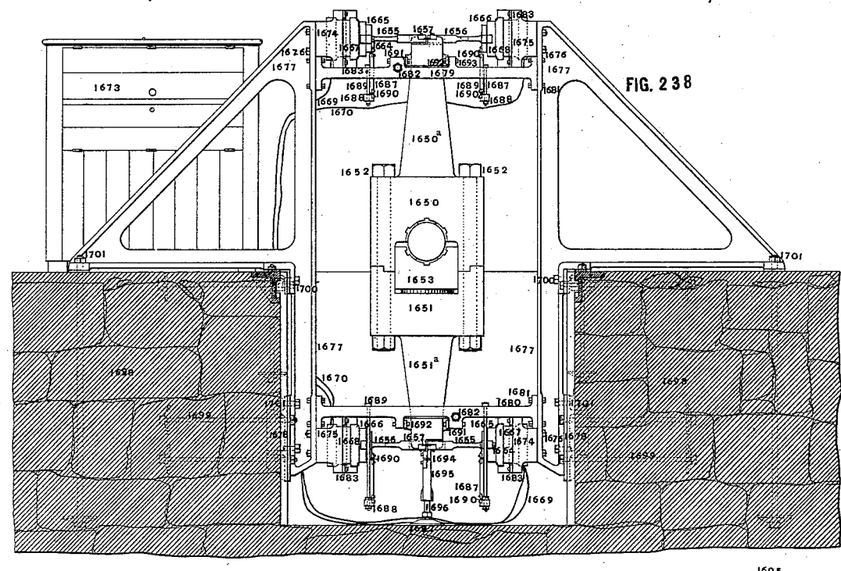
Fig. 238 is an elevation of the torsion weighing holder and its attachments, showing the foundation in section on line 238, Fig. 236.

The stationary holder and its connections, (shown in Figs. 236 and 238,) for retaining the fixed end of the specimen and transmitting torsional strains to the weighing or indicating apparatus, are constructed with two beams, 1650 1651, firmly connected together by bolts 1652, and containing between them a gripping-follower, 1653, which in the present illustration is shown as operated by a hydraulic press, as described in another application of even date herewith. Each beam is constructed with a projecting arm, 1650ª 1651ª, respectively, by which torsional strains are transmitted in either direction through the respective thrust plates or columns, 1655 1656, which are connected by flexible transmitting-plates 1657, and are flanged to bear on the scale-platforms 1665 1666. The thrust plates or columns which are to receive the load are connected by bolts 1664, as shown in the case of the plates 1655 in Fig. 238, to their platforms 1665, which transmit the load through the medium of hydraulic-pressure supports 1667 and pipes 1669 to a set of small chambers in the reducer 1671, Fig. 242, and from the reducer to suitable weighing mechanism in the weigh-case 1673. The thrust-plates 1656 are here shown disconnected from their scale-platforms 1666; but when the torsion specimen is to be strained in the opposite direction the thrust-plates 1655 are disconnected by the removal of the bolts 1664, which are then used to attach the thrust-plates 1656 to the platforms 1666. The load is then transmitted through the supports 1668 and pipes 1670 to a separate set of chambers in the reducer 1671, and from the reducer, through the pipes 1672, to the weighing apparatus in the weigh-beam case 1673. The reducer may be located outside of or within the weigh-beam case, or may be dispensed with entirely, in which latter case the small pressure-columns of the respective chambers with which the pipes 1669 and 1670 connect will act directly on the pressure-column of the weigh-beam, instead of on the reducer-column. By disconnecting one set of the thrust-plates, 1655, from their platforms 1665 and connecting the other set, 1656, with their platforms 1666, the set of pressure-supports 1667 are freed from the effect of any load on the specimen. The scale is then balanced, and will show the precise pressure communicated to the set of supports 1668 by the torsion-holder.

The arrangement of the two sets of pressure-supports 1667 1668, with their respective pipes 1669 1670, in relation to each other and to the reducer 1671 or the weigh-beam column, as the case may be, is illustrated in the diagram, Fig. 242. The hydraulic-pressure supports 1667 1668 have been fully described in other applications of even date herewith. One of them is shown on a larger scale in Fig. 241, together with parts of the bolts 1667ª, which are employed to attach its cap to the load-platform 1665 or 1666. The bases of the supports 1667 1668 are fastened to their respective beds 1674 1675 by bolts 1676. Stationary frames 1677 are firmly braced to the plates 1678 and masonry bed 1698 by bolts 1699 1700 1701. The frames 1677 are connected together by beams 1679 1680 and bolts 1681. The said beams are connected by bars 1682. The platforms 1665 1666 are supported and fixed against lateral motion relatively to their beds 1674 1675 by the spring-plates 1683, which are fastened to the beds and platforms, respectively, by bolts 1684 1685. To prevent any tipping of the platforms when disconnected from the thrust-plates, additional springs, 1686, are applied to the bolts 1684. The flanged ends of the thrust-plates 1655 1656 are supported by standards 1687, attached by thin-plate connections 1690 to their flanges, and to bars 1688, suspended by rods 1689 to the beams 1679 1680. Steel plates 1691 are fixed at their ends by bolts 1692 to beams 1679 1680, and at their centers by bolts 1693 to lugs on the arms 1650ª 1651ª. The plates 1691 fix the holder against longitudinal movement in the axis of the machine. The holder is supported on a thin flexible plate, 1694, clamped thereto and to a plate-column, 1695, which is adjustable in vertical position by the struts 1696, screwed therein and resting on the plate 1697 and bed 1698.

Figure 243:
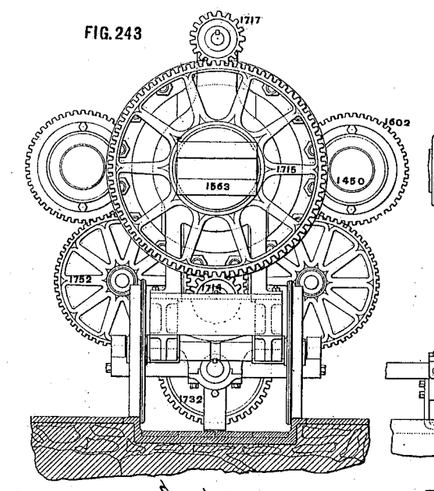
Fig. 243 is an end elevation of the straining-press and its attachments and the mechanism for rotating its ram.
Figure 244:
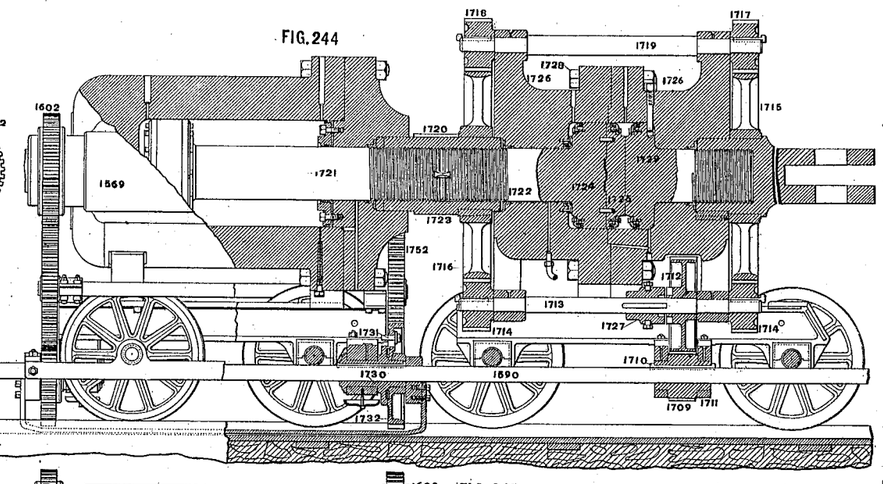
Fig. 244 shows a side elevation of the straining-press and its attachments, partly in section, including a section of the mechanism for rotating its ram.
Figure 245:
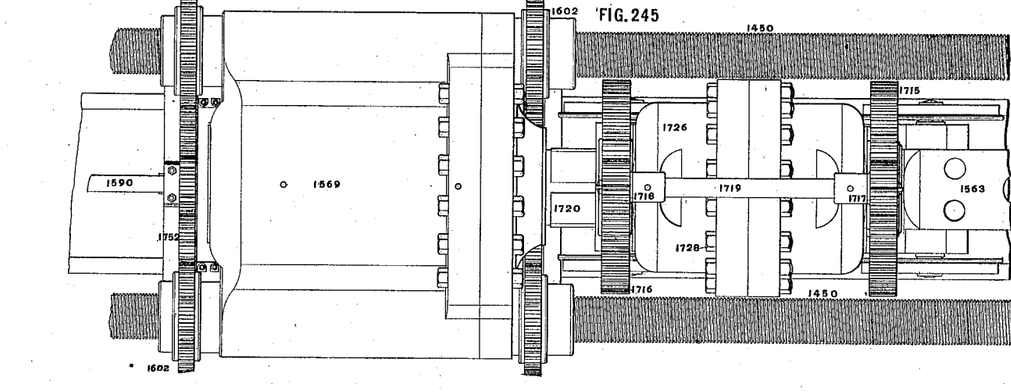
Fig. 245 shows a plan of the same.

Figs. 243, 244, and 245 show mechanism for imparting rotation to the ram to overcome or reduce packing friction. On the shaft 1590 is a sleeved pinion, 1709, fixed to said shaft by a key, 1710, and running in boxes 1711. The pinion 1709 drives a wheel, 1712, which may run loosely on its shaft 1713, but is fixed thereto at will by means of a clutch, 1727, so as to impart rotation to the said shaft. On the shaft 1713 are keyed pinions 1714 1714, which drive wheels 1715 1716, the former of which is an idler turning freely on the straining-link 1563. The wheel 1716 is keyed on a coupling-nut, 1720, attached to the ram 1721, as hereinafter described. The wheel 1715 drives a pinion, 1717, keyed on a shaft, 1719, which carries at its other end a pinion, 1718, gearing with the wheel 1716. The coupling-nut 1720 connects together, end to end, the piston-rods 1721 and 1722, both of which are fastened thereto by a key, 1723. 1721 constitutes a double-acting ram, the water being admitted at will to the respective ends of the cylinder in which it works, as may be required, for producing strains of tension or compression. The rod 1722 is constructed with a head, 1724 1725, and, together with it, works in a supplemental cylinder, 1726. The cylinder 1726 is made in two parts, secured together by flanges and bolts 1728. The piston-head is made in two parts, 1724 1725, for convenience in assembling, one being inserted in each part of the cylinder. At the extremity of the said cylinder is fixed an internal head, 1729, formed with a threaded stem, to which the straining-link 1563 is fixed. Liquid contained in the annular spaces within the cylinder 1726, at either end of the piston 1724 1725, constitutes a medium for transmitting a straining force in either direction from the rotary ram to the cylinder 1726 and link 1563 without resistance to the rotary motion, which is imparted to the ram to remove or reduce the friction of its own packings, so that the actual strain on the specimen may be accurately known. The action of the two pinions 1714 and 1718 on opposite sides of the wheel 1716 produces the desired rotation without lateral strain on the rams.

To admit of using the shaft 1590 for running the rotating mechanism, and also employing it for driving the nut-wheels 1602 when required to adjust the press bodily on the screws 1450, the said shaft carries a sleeve, 1730, which is connected by means of a radially-sliding clutch, 1731, with an otherwise loose wheel, 1732. The wheel 1732 drives the idle-wheels 1752, gearing with the nut-wheels 1602, as already described. Similar clutch-wheels and their accessories are provided at the other end of the press.

For gripping the cylindrical specimens for tension or compression by the holders, I may make use of dies 1484ª, (shown in section in Fig. 221 and in end elevation in Fig. 221ª,) the smaller dies fitting in the larger ones, with splines or feathers to keep them in their proper positions relatively. The main parts of these dies are kept from one slipping without the other by dowel-pins 1484ᵇ, which are driven tightly in the lower die and fit easily in the upper, and to hold these all together I make use of the small screws 1484ᶜ, and provide, also, small springs 1484ᵈ, to press the dies as far apart as the holders or screws will allow for the convenient insertion and removal of the specimens endwise, running the press back when necessary.

The details in construction and arrangement of hydraulic supports, reducers, and a weighing mechanism adapted for the torsion apparatus above described, and thin-plate attachments suitable for supporting the holder and for supporting and connecting the thrust-plates and other parts, are fully described in other applications of even date herewith.

Whatever novel subject-matter I have described and not claimed or attempted to claim herein I have claimed or attempted to claim in other applications or have reserved to be claimed in future original applications.

The following is here claimed as new:

1. In a testing-machine, the movable bed 1434, constructed and operating substantially as and for the purposes set forth.

2. The combination of the screws 1450, pillar-blocks 1449, and movable bed 1434, substantially as and for the purposes set forth.

3. In a testing-machine, the combination of recoil-springs 1442 with the movable supporting-bed 1434, operating substantially as set forth.

4. In a testing-machine, the combination of the movable bed 1434, connecting-rod 1433, fixed case or spring-bearings 1438, and two or more springs operating in conjunction in either direction, as set forth.

5. In a testing-machine, the combination, with the spring 1442 and suitable casing or support, 1438, of the adjusting-screws 1444, operating substantially as set forth.

6. In combination with two coupled beams constituting the bed and platform of the scale, the fixing plates or rods to prevent relative lateral motion of said beams, as set forth.

7. In combination with two coupled beams constituting the bed and platform of the scale, the fixing plates or springs 1471, attached together at their extremities and to the beams, respectively, at their centers.

8. The flexible rods or plates 1461, combined with the coupled beams 1455 1456, to hold them against vertical motion, as set forth.

9. The combination, with the coupled beams 1455 1456 and supporting rods or plates 1461, of the supporting and fixing springs or plates 1465, as and for the purposes set forth.

10. The combination, with the bed 1434 and coupled beams 1455 1456, of fixing rods or plates 1468, to adjust said beams and secure them against lateral motion in the machine.

11. The combination, with the coupled beams 1455 1456 and pillar-blocks 1449 1449ª, of the two sets of setting-rods 1457 1458, attached independently to the respective beams, for the purposes set forth.

12. The combination, with the movable bed 1434 and a stationary foundation, 1431, of the clamp-bolts 1435 and nuts 1436, with clearance-openings around said bolts, to permit longitudinal motion of the bed 1434, substantially as and for the purposes set forth.

13. In a testing-machine, a specimen-holder operated by a hydraulic press or presses, 1480, substantially as set forth.

14. The construction of the holder with a hydraulic press or presses for seizing and retaining the specimen, and with means for attaching said holder to the load or platform beam, or to a stationary bearing, or to the straining-beam or press, as the case may be.

15. The construction of the hydraulic specimen holder with three beams, 1475 1476 1477, and necessary tie-rods, 1478, two of the said beams being extended on one side to form cheek-pieces 1475ª 1477ª, for the attachment of the holder to the weigh-beam link or to the straining mechanism.

16. In a hydraulic specimen holder for testing-machines, the combination, with the fixed and movable jaws 1475 and 1477, of the check-blocks 1482, for limiting the closing of the jaws.

17. In a hydraulic specimen holder for testing-machines, the combination, with the fixed and movable jaws thereof, of the springs 1483, to open them automatically.

18. In a hydraulic specimen holder for testing-machines, the combination, with the fixed and movable jaws thereof, of the check-blocks 1482, for limiting the closing of the jaws, and the springs 1483, for causing the same to open automatically.

19. The stays 1496 1497, in combination with the pillar-block 1449 and holder, substantially as and for the purposes set forth.

20. The movable and reversible block 1486, adapted for use for strains of either tension or compression, in combination with the coupled beams 1455 1456, as set forth.

21. The combination of the scale-beam 1455, beam-block 1486, pin 1493, and link 1490 with the specimen-holder, substantially as and for the purposes set forth.

22. The combination of the scale-beam 1455, beam-block 1486, pins 1492 and 1493, and link 1490 with the specimen-holder, substantially as and for the purposes set forth.

23. The jointed support 1503, in combination with the block 1486, for the purposes set forth.

24. The combination of the clamps 1485 with the flanged beam 1455 or 1456, for holding thereto the flanged beam-block 1486 or flanged holder 1475$^a$ 1477$^a$.

25. A diaphragm or fixing-plate for a sealed pressure-chamber or a pressure-column, with a bent edge or edges secured within a dovetail groove or grooves by tamping or packing metal or other material into said groove or grooves, as set forth.

26. In combination with a pressure-support, the rubber or other yielding medium, constructed in two or more parts, confined within the base or pressure-column of the pressure-support, or within a plate interposed between the said pressure-support and the bed or beam of the scale, as and for the purposes set forth.

27. The coupling consisting of two chambered heads, 1528 1529, diaphragms 1531 1531, sealing-plugs 1532, and fixing-screws 1530, substantially as and for the purposes set forth.

28. The combination, with the column 1545 and its case 1535, of a fixing-plate, 1546, secured permanently to the column at its inner edge and clamped at its outer edge to the case, as set forth.

29. A pressure-column provided with two fixing-plates at or near its respective ends, fixed to the column and separable from the case and independent of the pressure-chamber diaphragm, substantially as set forth.

30. The combination of the pressure-column 1545, case 1535, chambered cap 1534, ring 1548, diaphragm 1549, and pressure-column head 1545$^a$, constructed and operating substantially as and for the purposes set forth.

31. The combination, with the base or chamber piece 1533, of the chamber-stem 1537, lining-plate 1540, annular diaphragm 1541, small pressure-column 1542, and ring 1544, substantially as and for the purposes set forth.

32. In combination with a torsional straining apparatus, a double-acting hydraulic ram, substantially as set forth.

33. In combination with a torsional straining apparatus, a double-acting hydraulic ram with a piston-rod projecting from both ends of the cylinder, substantially as and for the purposes set forth.

34. The combination of the straining-screws 1450, connecting-beam 1559, connecting-bars 1556, with torsion apparatus, substantially as set forth.

35. In a testing-machine, the combination of the piston or straining rod 1562, cross-head 1565, and one or more chains, 1582, with an arm or wheel for applying a torsional strain.

36. The combination of the piston or straining rod 1562, double-acting chains 1582 1584, and suitable connections with a torsion arm or wheel, substantially as set forth.

37. The combination of the chain-frame 1565 1578 1579, the double-acting chains 1582 1584, and chain-saddle 1576 on an arm or wheel of the torsion-bar, substantially as and for the purposes set forth.

38. The combination of the bolt or bolts 1580, straining and adjusting nut or nuts 1581, and chain-frame 1565 1578 1579 with the chains 1582 1584 and chain-saddle 1576 on an arm or wheel of the torsion-bar, substantially as and for the purposes set forth.

39. The combination of the straining-rod 1562, beam 1559, one or more stay-rods, 1556, pillar block or blocks 1572 or bed 1573, straining arm or wheel 1575, and a suitable torsion bar, shaft, or hub, substantially as set forth.

40. The combination, with a torsion bar, hub, or specimen-holder, of the worm-wheel 1575, screws 1566, shaft 1569, and driving-gear 1570, substantially as and for the purposes set forth.

41. The combination of the bed 1571, screw 1566, and worm-wheel 1575 with the setting-screw 1587, as and for the purposes set forth.

42. The combination of the torsion-bar 1574, the head 1611, and the supporting and adjusting beam 1615 with the fixing and adjusting plates 1627 1628, substantially as and for the purposes set forth.

43. The combination, in a testing-machine, of the torsion-bar 1574 and the adjustable crank-arm 1612.

44. The combination of the torsion-bar 1574, head 1611, crank-arm 1612, and clamp-plates 1613.

45. In a testing-machine, a movable supporting-beam constructed with a bed, 1639, and cap 1638, to receive and hold a specimen, in combination with the supporting and fixing ways 1626, substantially as set forth.

46. A supporting-holder, stationary or nearly so, deriving torsional strains in either direction from the specimen under test, and transmitting said strains through an arm or arms to a suitable indicating apparatus to show the torsional strains.

47. A holder stationary, or nearly so, as regards rotation, adapted, substantially as described, to receive torsional strains in either direction from a specimen under test, and to transmit the said strains to an indicating apparatus through the medium of two or more arms projecting from different sides of the holder.

48. In a testing-machine, the two beams 1650 1651, with their projecting arms 1650$^a$ 1651$^a$, in combination with the connecting-bolts 1652 and a suitable device to grip and hold the specimen while undergoing strains of torsion.

49. The combination of a holder, stationary or nearly so, one or more arms projecting therefrom, and a pair of plates or columns, 1655 1656, attached to each arm, and adapted for the optional connection and use of either plate or column of each pair, with suitable weighing or indicating apparatus to show strains of torsion in either direction at will.

50. The combination, with a holder and one or more arms projecting therefrom, of one or more hydraulic-pressure supports to receive from said arm or arms pressure derived from strains of torsion on the specimen, and transmit pressure to suitable weighing or indicating apparatus.

51. The combination, with a torsion specimen holder, of two sets of hydraulic-pressure supports arranged for optional use to transmit pressure derived from strains in opposite directions to suitable weighing apparatus through a pressure-chamber common to both.

52. The combination, with the thrust plates or columns 1655 1656, of the supporting standards or columns 1687, connected to their supporting-bearings and to the said thrust-plates by thin flexible attaching-plates, substantially as and for the purposes set forth.

53. The combination of the flexible plates 1691 with the torsion-holder, to fix it against longitudinal motion, as described.

54. The double-acting ram 1721, in combination with the supplemental pistons 1724 1725, cylinders 1726, and suitable mechanism for imparting rotation to the ram, for the purpose set forth.

55. The combination of the double-acting ram, the supplemental pistons 1724 1725 and cylinders 1726 1726, and the shafts 1713 1719, pinions 1714 1717 1718, and gear-wheels 1715 1716, for rotating the ram, substantially as and for the purposes set forth.

56. The combination of the dowel-pins $1484^b$, dies $1484^a$, screws $1484^c$, and springs $1484^d$, as and for the purposes set forth.

ALBERT H. EMERY.

Witnesses:
OCTAVIUS KNIGHT,
WALTER ALLEN.